April 19, 1927.
G. FORNACA
1,625,596
SPEED REDUCER FOR INTERNAL COMBUSTION ENGINES
Filed Aug. 13, 1924
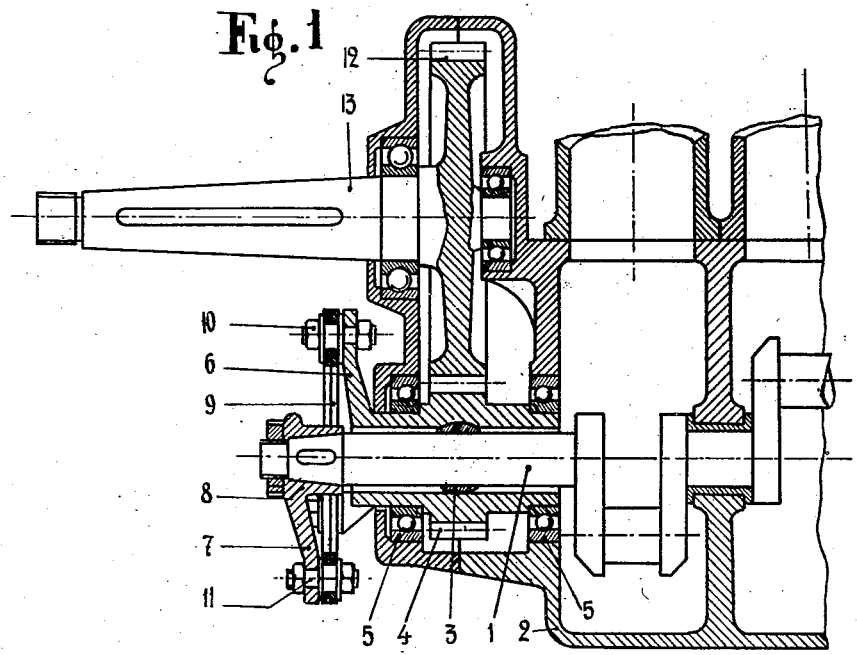
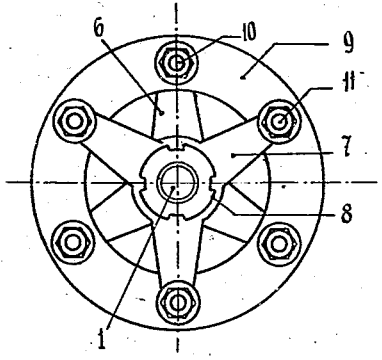
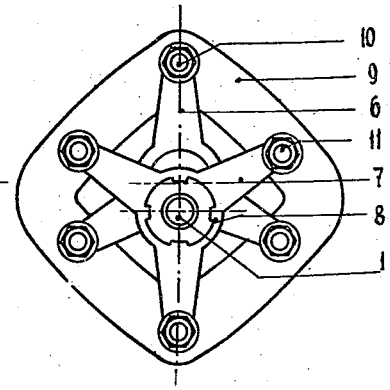
Inventor
Guido Fornaca,
By [signature] Atty Patented Apr. 19, 1927.

1,625,596

UNITED STATES PATENT OFFICE.

GUIDO FORNACA, OF TURIN, ITALY.

SPEED REDUCER FOR INTERNAL-COMBUSTION ENGINES.

Application filed August 13, 1924, Serial No. 731,852, and in Italy August 23, 1923.

In internal combustion engines it is generally the rule to place between the crank shaft and the driven shaft a speed reducer usually consisting of two or more pairs of gear wheels.

The driving gear being normally secured on the end of the crank shaft follows the unavoidable bending and vibrating movements of said shaft.

Owing to said bending and vibrating movements, even when of but short duration, shocks are produced on the meshed gear teeth and cause a rapid wear of them.

This invention has for its object to provide mechanism through which it is possible to fully eliminate said shocks and is characterized by the fact that the driving gear is mounted on very strong bearings whereby it is rigidly supported and rendered independent from the vibrating and bending movements of the crank shaft, any stiff connection between the two members being eliminated and substituted by a spring connection.

The annexed drawings show diagrammatically by way of example a constructional form of the device.

Fig. 1 is a longitudinal section of the device applied to an internal combustion engine of a known type.

Fig. 2 is a front view of the spring connecting member placed between the driving gear of the speed reducer and the crank shaft in the inactive position.

Fig. 3 is a front view of the spring connecting member between the driving gear of the speed reducer and the crank shaft during the working and showing in a magnified scale a bending movement of the crank shaft, which is absorbed and annulled by the spring member.

Referring to the drawings, 1 is the engine crank shaft; 2 the engine crank case; 3 a spherical support of the end of the crank shaft, 4 the driving gear of the speed reducer constituting a hollow counter shaft concentrically surrounding the outer end portion of the shaft 1; 5 are ball bearings for the counter shaft 4; 6 arms of the latter; 7 arms of a hub 8 rigidly secured by means of a cone and key connection on the end of the crank shaft 1. 9 is a ring-shaped spring connecting member constituted by any material such as cloth, rubber or leather suitably treated in order to become sufficiently strong to overcome the strains to which it is subjected maintaining at the same time a certain elasticity. 10 are bolts provided with nuts through which the connecting member 9 is secured to the arms 6. 11 are bolts provided with nuts and fixing the connecting member to the arms 7. 12 is the driven gear of the speed reducer, which is secured on a shaft 13 transmitting the engine power to any mechanism adapted to utilize it.

The device works as follows:

Assuming the engine to be in the inactive position, the crank shaft 1 will be coaxial with the driving gear 4, as shown in Fig. 1 and the connecting member 9 takes the position and form shown in Fig. 2.

If on the contrary it is assumed that the engine is working, the vibrating and bending movements of the crank shaft may take place without being transmitted to the driving gear 4, because the spherical support 3 allows of a free bending movement of the end of the crank shaft 1 while the connecting member 9 may freely be subjected to deformation though continuing to transmit the movement of the crank shaft 1 to the driven gear 4 through the arm 7 of the hub 8 and arms 6 of the gear 4.

Fig. 3 shows (magnified for the sake of clearness) the forms that may be assumed by the connecting member 9 and the relative positions of the arms 7 of the piece 8 and arms 6 of the gear 4.

The spring connecting member will be conveniently placed outside the crank case 2 in order to prevent any splash of lubricating oil reaching and damaging the same.

What I claim is:

In a speed reducing mechanism, the combination with a casing, of driving and driven shafts projecting outwardly from the casing, a hollow counter-shaft mounted concentrically to the driving shaft, an antifriction bearing for the counter shaft, a spherical journal supporting the driving shaft within the counter shaft, radial arms fixed on the outer end of the driving shaft, radial arms fixed on the counter shaft, and a flexible member connecting the arms of one shaft to the arms of the other shaft.

In testimony that I claim the foregoing as my invention, I have signed my name.

GUIDO FORNACA.